United States Patent

[15] 3,645,353

Cope et al.

[45] Feb. 29, 1972

[54] CONTROL ELEMENT MOUNTING ARRANGEMENT

[72] Inventors: Kenneth P. Cope, Warren; Donald G. Baer, Girard, both of Ohio

[73] Assignee: General Motors Corporation, Detroit, Mich.

[22] Filed: Apr. 23, 1970

[21] Appl. No.: 31,083

[52] U.S. Cl. ................................180/90, 248/27, 339/128
[51] Int. Cl. ........................................................B60k 37/06
[58] Field of Search ..........................180/90, 82; 280/150 B; 339/128; 248/27, 223

[56] References Cited

UNITED STATES PATENTS

| | | | |
|---|---|---|---|
| 3,182,162 | 5/1965 | Gelfand et al. | 180/90 X |
| 3,534,938 | 10/1970 | Jordan et al. | 248/223 X |
| 3,384,858 | 5/1968 | Johnson | 339/128 X |
| 3,053,337 | 9/1962 | Prohaska et al. | 180/90 |
| 3,168,612 | 2/1965 | Sorenson | 248/27 X |
| 3,278,145 | 10/1966 | Leshuk | 248/27 |
| 3,337,076 | 8/1967 | Ast | 248/27 X |

Primary Examiner—Kenneth H. Betts
Attorney—W. E. Finken and D. L. Ellis

[57] ABSTRACT

An arrangement for mounting a switch assembly on a vehicle instrument panel structure so as to be releasable under impacts, the arrangement including a receptacle having a hook-shaped projection and a cantilever spring-type latch element with a cam surface thereon. The switch assembly and receptacle are unitized and the hook-shaped projection on the latter engages the lower margin of an aperture in the panel structure to detachably mount the switch and receptacle unit on the panel structure for pivotal movement between a mounted position in the aperture and a releasing position angularly spaced from the mounted position. The latch member resiliently engages the panel structure to maintain the receptacle in the mounted position and the cam surface is operable under a force of impact on the receptacle to initiate deflection of the latch member and release of the switch and receptacle unit for pivotal movement from the mounted to the releasing position.

3 Claims, 5 Drawing Figures

PATENTED FEB 29 1972  3,645,353

INVENTORS.
Kenneth P. Cope &
BY Donald G. Baer
D.L. Ellis
ATTORNEY

ന്ദ്ര്യ3,645,353

CONTROL ELEMENT MOUNTING ARRANGEMENT

This invention relates generally to vehicle instrument panels and control elements thereon and in particular to a mounting arrangement for such control elements operative for ready detachment of the element from the panel structure under the force of a compressive impact.

The primary feature of this invention is that it provides an improved mounting arrangement for vehicle instrument panel mounted control elements wherein the control element is securely held on the instrument panel or other surface under normal operating conditions but wherein nominal compressive impacts on the instrument panel release the control element to remove it from resistance to the impact, the mounting arrangement including a receptacle, means detachably mounting the receptacle on the panel for pivotal movement, resilient latch means for maintaining the receptacle in a mounted position and cam means operable to unlatch the receptacle from the panel under the force of a compressive impact to the control element. Another feature of this invention is that it provides a switch and receptacle unit wherein the receptacle has the switch secured thereto and includes a projection which releasably supports the unit on the panel for limited pivotal movement and which further includes a cantilever spring latch element having a cam surface thereon which cam surface is operable under a force of impact to the switch to deflect the cantilever spring to release the unit for detaching movement from the panel.

These and other features of this invention will be readily apparent from the following specification and from the drawings wherein.

Figure 1:
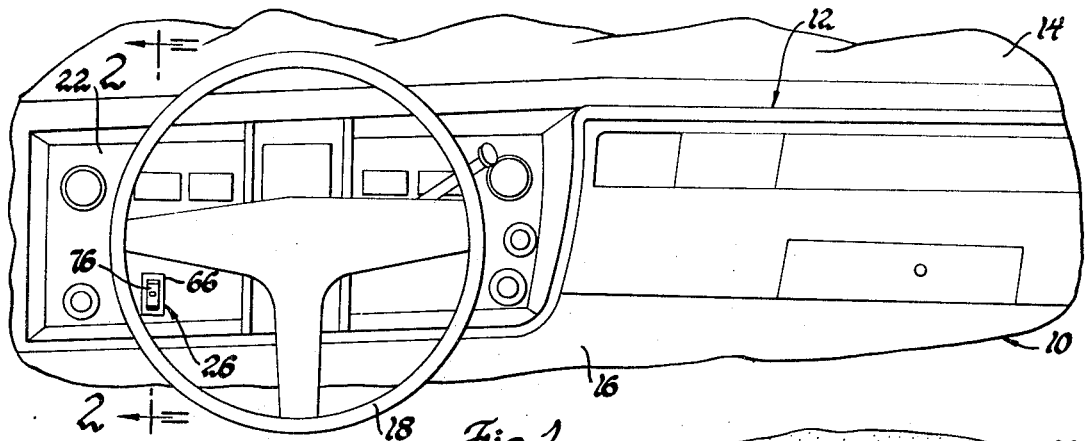
FIG. 1 is a fragmentary elevational view of the interior of an automobile-type vehicle body and showing an instrument panel structure whereon a switch is mounted in accordance with this invention.
Figure 2:
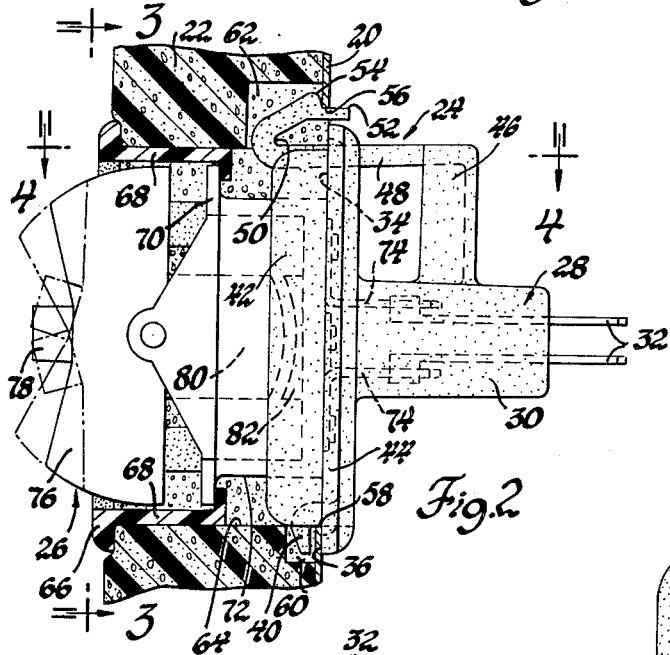
FIG. 2 is an enlarged sectional view taken generally along the plane indicated by lines 2—2 in FIG. 1.
Figure 3:
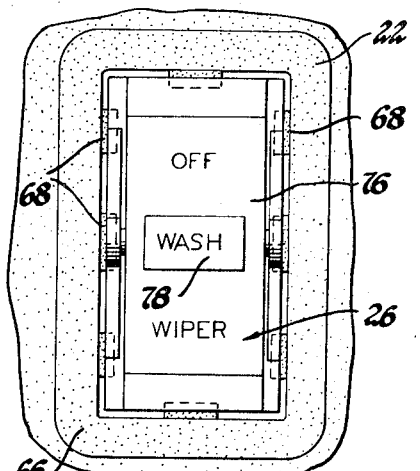
FIG. 3 is a view taken generally along the plane indicated by lines 3—3 in FIG. 2.

Referring now to FIG. 1 of the drawings, an automobile-type vehicle body generally designated 10 has an interior wherein an instrument panel structure 12 is conventionally suspended below a typical front windshield 14 and generally over a toe panel 16. A steering wheel 18 is mounted on the distal end of a steering column assembly, not shown, conventionally attached to the vehicle body and instrument panel structure and is situated between the latter and the space normally occupied by the vehicle operator, not shown. As best seen in FIG. 2, the instrument panel structure, in the area generally forward of the steering wheel 18, includes a relatively stiff inner steel panel 20 covered with a layer of protective foam 22 the skin or outer surface of which is finished to provide an attractive appearance. The foam pad and inner panel support a plurality of instruments and controls including both switches and gauges and, more particularly, support, through a mounting arrangement according to this invention and generally designated 24, FIG. 2, a switch 26 operable to control the vehicle windshield washer and wipers.

Figure 4:
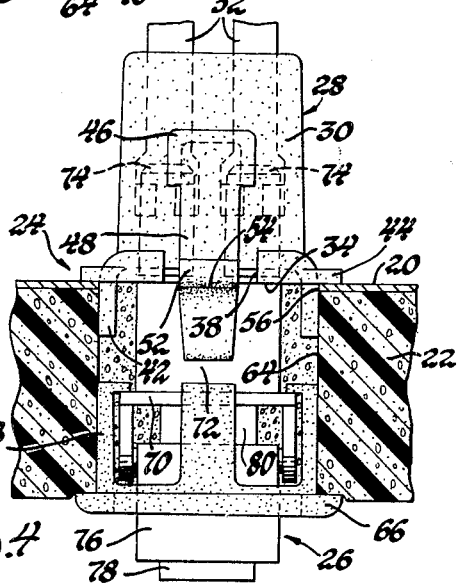
FIG. 4 is a sectional view taken generally along the plane indicated by lines 4—4 in FIG. 2.
Figure 5:
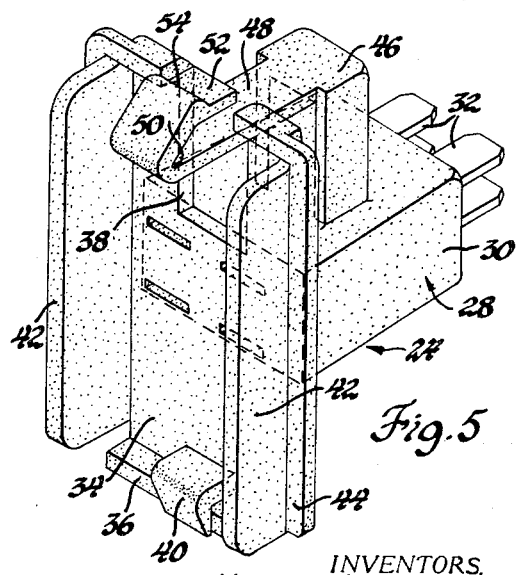
FIG. 5 is a perspective view of the receptacle portion of the mounting arrangement according to this invention.

Referring more particularly now to FIG. 2, 4 and 5, the mounting arrangement 24 includes a receptacle 28 fabricated from a conventional insulating-type material such as hard rubber or plastic. The receptacle 28 includes an electrical connector portion 30 having four conventional socket-type terminal 32 therein the blade portions of which project from connector portion 30. The blade portions of the terminals 32 are adapted to be received within a detachable connector, not shown, for connection thereby to the windshield wiper and washer electrical control circuits. As best seen in FIG. 5, the receptacle 28 further includes a flat face 34 having an upturned tab 36 at the lower margin thereof, a generally rectangular upwardly opening notch 38 at the upper margin thereof and an integral projection in the form of a downturned hook 40 overlying tab 36. A pair of ears 42 extend generally perpendicularly to flat face 34 and a flange 44 projects beyond ears 42 and generally across the upper margin of the flat face 34, FIG. 5.

A support 46 integral with connector portion 30 of the receptacle extends generally perpendicularly thereto and carries resilient latching means including a cantilever spring element 48 having one end integral with support 46. As best seen in FIGS. 2 and 5, the distal end of the cantilever spring element is upturned at 50 and terminates in a flat latching surface 52 extending generally parallel to the main body of the cantilever spring element. The latching surface 52 is bounded on one end by the edge of the cantilever spring element and on the other end by a cam surface 54 extending obliquely upward from the latching surface. The natural resilience of the cantilever spring element functions to urge the latching surface 52 upward, FIG. 2, toward a relaxed position, FIG. 5.

In mounting the receptacle 28 on the instrument panel structure 12, the lower margin of flat face 34 is introduced into a generally rectangular aperture 56 in inner steel panel 20 and lowered over lower marginal edge 58 of the aperture 56 until downturned hood 40 enters a recess 60, FIG. 2, in foam pad 22 and engages the edge 58 to thereby detachably mount the receptacle on the instrument panel structure for pivotal movement about an axis defined by the lower marginal edge 58. The receptacle is then pivoted counterclockwise, FIG. 2, from this initial or releasing position to a mounted position in the aperture 56, FIGS. 2 and 4, wherein flange 44 abuts the rear surface of inner steel panel 20 and wherein ears 42 engage the vertical sides of aperture 56 to laterally stabilize the receptacle. By the way of further clarification, the releasing position of the receptacle 28 is virtually any position of the receptacle angularly spaced clockwise, FIG. 2, from the mounted position wherein enough clearance exists between the upper portion of the receptacle and the inner steel panel to permit sufficient upward bodily shiftable movement of the receptacle for detachment of hook 40 from the lower marginal edge 58.

As the receptacle is pivoted from the releasing to the mounted position, the cantilever spring element 48 engages the upper marginal edge of the aperture 56 in the area of the former behind cam surface 54 and is deflected counterclockwise, FIG. 2, until shortly before the mounted position of the receptacle is achieved when the cam surface passes under the upper marginal edge of aperture 56 and permits cantilever spring element 48 to lift the latching surface 52 up into contact with the upper marginal edge of the aperture 56. A recess 62, FIG. 2, in the foam pad 22 in the area adjacent the upper marginal edge of aperture 56 receives the upturned portion of the cantilever spring element 48 adjacent latching surface 52. Any tendency of the receptacle to rotate back toward the releasing position is resisted at the junction of the cam surface 54 and latching surface 52 resiliently held against the upper marginal edge by the cantilever spring element.

As best seen in FIGS. 2 and 4, a switch receiving aperture 64 is molded into the protective foam pad 22 and conforms generally to the shape of the rectangular aperture 56 in inner panel 20. A rectangular decorative escutcheon 66 seats against the skin or outer surface of the foam pad 22 around the aperture 64 and has a plurality of flexible tabs 68 projecting into the aperture. The flexible tabs 68 function to hookingly engage a flange 70 extending around a base portion 72 of the switch 26 when the latter is introduced into aperture 64. The base portion 72 has four blade-type electrical terminals 74 thereon and supports a head portion 76 for rocking movement between an inactive position, shown in solid lines in FIG. 2, and either of two active positions, shown in broken lines in FIG. 2. THe head portion 76 includes a washer activating button 78 and contacting means generally designated 80, FIG. 2.

The base portion 72 with head portion 76 thereon is received within the escutcheon 66 until flange 70 on the former is hookingly engaged by flexible tabs 68 on the latter. Simultaneously, the blade terminals 74 are frictionally received in the socket terminals 32 until the bottom of the base portion abuts flat face 34 of the receptacle 28 to thereby unitize the switch and receptacle. The friction between the blade and socket terminals 74 and 32 is the only force holding the switch assembly in the receiving aperture 64 and the flange 70 on base portion 72 functions solely to maintain the escutcheon in position. Thus installed, manual rocking of the head portion 76 from the inactive to either active position causes contacting means 80 to engage corresponding contacting means 82, FIG. 2, on the base so as to activate the vehicle windshield wipers. Similarly, manual depression of the button 78 functions, through contacting means 80 and 82, to activate the vehicle windshield washer.

Under normal operating conditions no significant compressive forces will be exerted on the surface or skin of the protective foam pad 22. However, in abnormal situations, as in a collision, an impact may occur on the instrument panel structure in the area of the switch 26. To preserve the resilient protective characteristics of the foam pad 22, the switch is mounted on the instrument panel to offer virtually no resistance to the force of impact. More particularly, the force of impact on the switch assembly is instantaneously applied to the receptacle 28 tending to push the switch and receptacle unit through aperture 56 in the inner steel panel 20. This tendency is initially resisted by the tabs 68 on the escutcheon and by hook 40 and cantilever spring latch element 48. When the force of impact exceeds a predetermined magnitude the tabs 68 yield to permit unobstructed movement of the switch and receptacle unit. Simultaneously, the vertical component of the force reaction of the steel inner panel 20 on the cam surface 54 of the cantilever spring element overcomes the opposing resilient force exerted by the spring element and initiates counterclockwise deflection of the latter, FIG. 2. The deflection continues until the upper edge of the cam surface 54 is forced below the upper marginal edge of the aperture 56 whereupon virtually all resistance to movement of the switch and receptacle unit toward the aforementioned releasing position of the receptacle is removed. The force of impact, thereafter, causes rapid separation of the receptacle from the inner steel panel so that the full protective capability of the foam pad in the area of the switch may be realized.

Having thus described the invention, what is claimed

1. In an instrument panel structure including a rigid plate member and a relatively thick compressible pad member disposed against one side of said plate member for deflection in a cushioning mode in response to a compressive impact thereon, the combination comprising, means defining a recess in said pad member, means defining a recess in said plate member registering with said pad member recess and cooperating therewith in defining a passage through said panel structure, a control element unit adapted for disposition in said passage in an operational position wherein one end of said unit is situated in generally flush relation to the outer surface of said pad member, and quick release means adapted to connect said unit to said plate member in a manner whereby said unit is normally rigidly supported in said operational position on said plate member but is releasable therefrom in response to a compressive impact on said unit thereby to preserve the impact cushioning ability of said pad member in the area of said unit, said quick release means including latch means on said unit and on said plate member operative in a latched condition to rigidly support said unit on said plate member and cam means on said unit and on said plate member responsive to compressive forces exerted on said unit to effect a change in the condition of said latch means from the latched condition to an unlatched condition permitting substantially instantaneous release of said unit from said plate member.

2. In an instrument panel structure including a rigid plate member and a relatively thick compressible pad member disposed against one side of said plate member for deflection in a cushioning mode in response to a compressive impact thereon, the combination comprising, means defining a recess in said pad member, means defining a recess in said plate member registering with said pad member recess and cooperating therewith in defining a passage through said panel structure, a control element adapted for disposition in said pad member recess in an operational position wherein one end of said control element is situated in generally flush relation to the outer surface of said pad member, a receptacle adapted for disposition in said plate member recess, means on said receptacle and on said control element operative to unitize the former and the latter, means on said receptacle and on said plate member operative to detachably mount said control element and receptacle unit in said passage and on said plate member for pivotal movement about an axis of said plate member between a mounted position wherein said control element is disposed in the operational position thereof and a releasing position angularly spaced from said mounted position wherein said unit is readily detachable from said plate member, a cantilever spring element having latch means thereon, means rigidly attaching said cantilever spring element to one of said plate member and said unit, said latch means being resiliently urged by said cantilever spring element to a latching position engaging the other of said plate member and said unit to rigidly support said unit on said plate member, and cam means on one of said plate member and said unit associated with said latch means and responsive in the mounted position of said unit to compressive forces on the latter to move said latch means against said cantilever spring element from the latched position to an unlatched position permitting substantially instantaneous movement of said unit from the mounted to the releasing position thereof thereby to preserve the impact cushioning ability of said pad member in the area of said control element.

3. In an instrument panel structure including a rigid plate member and a relatively thick compressible pad member disposed against one side of said plate member for deflection in a cushioning mode in response to a compressive impact thereon, the combination comprising, means defining an aperture in said pad member, means defining an aperture in said plate member registering with said pad member aperture and cooperating therewith and defining a passage through said panel structure, a control element adapted for disposition in said pad member aperture in an operational position wherein one end of said control element is situated in generally flush relation to the outer surface of said pad member, a receptacle adapted for disposition in said plate member aperture, means on said receptacle and on said control element operative to unitize the former and the latter, means defining a hooklike projection on one of said receptacle and said plate member adapted to hookingly engage the other for releasably mounting said control element and receptacle unit on said plate member and in said passage for pivotal movement about an axis of said plate member between a mounted position wherein said control element is disposed in the operational position thereof and a releasing position angularly spaced from said mounted position wherein said unit is readily detachable from said plate member, and means defining an integral cantilever spring element on said receptacle having latch means and a cam surface thereon, said cantilever spring element in the mounted position of said unit resiliently urging said latch means to a latched position engaging said plate member to relatively rigidly support said unit on said plate member and said cam surface being operative in response to compressive impact on said unit to deflect said cantilever spring element from the position thereof corresponding to the latched position of said latch means to a position corresponding to an unlatched position of said latch means permitting substantially instantaneous pivotal movement of said unit from the mounted to the releasing position thereof thereby to preserve the impact cushioning ability of said pad member in the area of said control element.